United States Patent [19]

Osborne et al.

[11] Patent Number: 4,855,276

[45] Date of Patent: Aug. 8, 1989

[54] SOLID FILTRATION MEDIUM INCORPORATING ALUMINA AND CARBON

[75] Inventors: Michael W. Osborne, Lilburn; Cynthia A. Afforder, Duluth; William G. England, Suwanee, all of Ga.

[73] Assignee: Purafil, Inc., Doraville, Ga.

[21] Appl. No.: 92,134

[22] Filed: Sep. 2, 1987

[51] Int. Cl.$^4$ .................. G01B 31/08; B01J 20/08; B01J 20/20; B01J /20/04

[52] U.S. Cl. .................. 502/415; 55/70; 55/71; 55/73; 55/74; 423/230; 423/239; 423/241; 423/244; 423/245.1; 423/247; 502/416; 502/417

[58] Field of Search .................. 502/415, 416, 417

[56] References Cited

U.S. PATENT DOCUMENTS

| | | | |
|---|---|---|---|
| 1,452,739 | 4/1923 | Hood | 502/415 |
| 1,781,664 | 11/1930 | Rockwell | 423/236 |
| 1,843,355 | 2/1932 | Behrman | 423/499 |
| 2,196,246 | 4/1940 | Brown et al. | 23/154 |
| 2,423,702 | 7/1947 | Hart | 252/265 |
| 2,537,448 | 1/1951 | Engel | 23/3 |
| 3,049,399 | 8/1962 | Gamson et al. | 21/53 |
| 3,226,332 | 12/1965 | Lincoln et al. | 252/184 |
| 3,360,134 | 12/1967 | Pullen | 502/415 |
| 3,391,988 | 7/1968 | Friess | 23/2 |
| 3,416,293 | 12/1968 | Alexander | 55/73 |
| 3,578,390 | 3/1981 | Kruel | 23/2 |
| 3,598,521 | 8/1971 | Alley | 23/25 |
| 3,696,629 | 10/1972 | Heston, Jr. | 62/129 |
| 3,736,726 | 6/1973 | Grimm et al. | 55/73 |
| 3,819,532 | 6/1974 | Cracknell | 502/415 |
| 3,842,014 | 10/1974 | Friend | 502/415 |
| 4,072,479 | 2/1978 | Sinha et al. | 55/73 |
| 4,072,480 | 2/1978 | Wagner | 55/73 |
| 4,113,839 | 9/1978 | Maki et al. | 502/417 |
| 4,215,096 | 7/1980 | Sinha et al. | 423/241 |
| 4,263,268 | 4/1981 | Knox | 423/449 |
| 4,273,751 | 6/1981 | Sinha et al. | 423/210 |
| 4,499,208 | 2/1985 | Fuderer | 502/415 |

FOREIGN PATENT DOCUMENTS

| | | |
|---|---|---|
| 58-153537 | 3/1983 | Japan . |
| 58-183941 | 10/1983 | Japan . |
| 61-54236 | 3/1986 | Japan . |
| 61-178089 | 8/1986 | Japan . |
| 406552 | 6/1974 | U.S.S.R. . |
| 1219122 | 3/1986 | U.S.S.R. . |

OTHER PUBLICATIONS

Chemical Abstracts, vol. 64, Jan. 3–Jan. 31, 1966.
Purakol Media Product Bulletin 135-E.
Material Safety Data Sheet, Kina Carbon, Sutcliffe Speakman Carbons LTD, Manufacturer, Mar. 27, 1986.
Maaterial Safety Data Sheet, Calgon Carbon Corporation, manufacturer, dated Aug. 1985.
Purafil Chemisorbant Media Product Bulletin 125-F.
Material Safety Data Sheet, Purafil, Inc., manufacturer, dated May 19, 1986.
Purakol Media Product Bulletin 135-E.
Material Safety Data Sheet, Kina Carbon, Sutcliffe Speakman Carbons LTD, Manufacturer, Mar. 27, 1986.
Material Safety Data Sheet, Calgon Carbon Corporation, manufacturer, dated Aug. 1985.
Purafil Chemisorbant Media Product Bulletin 125-F.
Material Safety Data Sheet, Purafil, Inc., manufacturer, dated May 19, 1986.

*Primary Examiner*—Paul E. Konopka
*Attorney, Agent, or Firm*—Jones, Askew & Lunsford

[57] ABSTRACT

An adsorbent composition, method of preparing same, and method of treating a fluid stream with the absorbent are disclosed. Alumina and carbon are combined with water in preferred proportions in one embodiment. Sodium bicarbonate and impregnates such as Group 1A metal hydroxides and Group 7A salts of Group 1A metals can be added. Improved efficiency of removal of compounds such as hydrogen sulfide is achieved, and ignition temperature is reduced.

15 Claims, No Drawings

SOLID FILTRATION MEDIUM INCORPORATING ALUMINA AND CARBON

TECHNICAL FIELD

The present invention relates generally to a composition and a method for the removal of compounds having toxic or corrosive properties or disagreeable odors, especially sulfur containing compounds, from gaseous streams. The invention more particularly relates to the use in filter beds of a substrate incorporating a mixture of activated carbon and activated alumina. The substrate may be impregnated with a variety of substances, such as potassium hydroxide, potassium iodide, sodium bicarbonate, and/or moisture, among others.

BACKGROUND ART

Undesirable airborne compounds, including sulfur compounds, ammonia, formaldehyde, urea, carbon monoxide, oxides of nitrogen, mercaptans, amines, and ethylene, occur in a number of environments, where most primarily are responsible for the presence of disagreeable odors, or irritating or toxic gases. Such environments include petroleum storage areas, sewage treatment facilities, hospital morgues, animal rooms, and pulp and paper production sites, among others. These undesirable compounds may be bacterial breakdown products of higher organic compounds, or by-products of industrial processes.

Hydrogen sulfide ($H_2S$), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. $H_2S$ is also flammable.

Ammonia ($NH_3$), also a colorless gas, possesses a distinctive, pungent odor and is a corrosive, alkaline gas. The gas is produced in animal rooms and nurseries and its control also has long been considered desirable.

Chlorine ($Cl_2$) is a greenish-yellow gas with a suffocating odor. The compound is used for bleaching fabrics, purifying water, treating iron, and other uses. Control of this powerful irritant is most desirable for the well-being of those who work with it or are otherwise exposed to it. At lower levels, in combination with moisture, chlorine has a corrosive effect on electronic circuitry, stainless steel and the like.

Formaldehyde (HCHO) is a colorless gas with a pungent suffocating odor. It is present in hospital morgues, and because it is intensely irritating to mucous membranes, its control is desirable.

Urea ($CH_4N_2O$) is present in toilet exhaust and is used extensively in the paper industry to soften cellulose. Its odor makes control of this compound desirable.

Carbon monoxide (CO), an odorless, colorless, toxic gas, is present in compressed breathing air. Oxygenation requirements for certain atmospheres, including those inhabited by humans, mandate its control.

Oxides of nitrogen, including nitrogen dioxide ($NO_2$) nitric oxide (NO), and nitrous oxide ($N_2O$), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ($CH_3SH$), butyl mercaptan ($C_4H_9SH$) and methyl amine ($CH_5N$), are undesirable gases present in sewerage odor. The control of these gases is desired for odor control.

Ethylene ($C_2H_4$) is a colorless, flammable gas that is a simple asphyxiant which accelerates the maturation or decomposition of fruits, vegetables, and flowers. Control of this compound prolongs the marketable life of such items.

Attempts have been made to provide solid filtration media for removing the undesirable compounds described above. Desired features of such media are a high total adsorption capacity for the targeted compound, high efficiency in removing the compound from an air stream flowing over the media, and a low ignition temperature (non-flammability). For example, U.S. Pat. No. 3,049,399 describes a solid oxidizing system in pellet form composed of activated alumina, $Al_2O_3$, impregnated with potassium permanganate, $KMnO_4$. This pellet provides air purification and odor control by both adsorbing and adsorbing odors, and then destroying the collected odors by the potassium permanganate's controlled oxidizing action.

The prior art reveals that activated carbon will physically adsorb considerable quantities of hydrogen sulfide. See, for example, U.S. Pat. No. 2,967,587. See also French Patent No. 1,443,080, which describes adsorption of hydrogen sulfide directly by activated carbon, which is then regenerated by hot inert gas or superheated steam.

The prior art also reveals that better removal of sulfur compounds can be accomplished by the catalysis of the oxidation of hydrogen sulfide to sulfur, based on the ability of carbon to oxidize hydrogen sulfide to elemental sulfur in the presence of oxygen. Ammonia may be added to an influent gas stream of hydrogen sulfide and oxygen to provide catalysis. Silicate-impregnated activated carbon is also effective. The residual adsorbate, however, may not be removed by extraction with alkaline solutions. See South African Patent No. 70/4611. Treatment with a 1% solution of NaOH restores the adsorption capacity of activated carbons used for adsorption removal of hydrogen sulfide gas. Boki, *Shikoku Igaku Zasshi*, 30(c), 121-8 (1974) (*Chemical Abstracts*, Vol. 81.

See also, for example, French Patent No. 1,388,453, which describes activated carbon granules impregnated with 1% iodine ($I_2$) for this use. South African Patent No. 70/4611 discloses the use of silicate-impregnated activated carbon. Swinarski et al, *Chem. Stosowana*, Ser. A 9(3), 287-94(1965), (*Chemical Abstracts*, Vol. 64, 1379c), describe the use of activated carbon treated with potassium salts, including potassium hydroxide (KOH) for hydrogen sulfide adsorption. Activated carbon has also been impregnated with a solution of sodium hydroxide (NaOH) and potassium iodide (KI).

Other known methods of impregnating activated carbon for removing sulfur compounds from gas streams include the use of carbonate or hydroxide of potassium or sodium as the impregnate. See Japanese Patent Application No. 39-23720. Another method removes mercaptans from exhaust gas by contact with an adsorbent impregnated with a liquid mixture of an alkaline material. U.S. Pat. No. 3,391,988. Subsequent patents have taught different treatments of activated carbon with NaOH and, optionally, lead acetate (PbOAc), and have indicated the influence of the chemical reaction therein combined with the physical adsorption of the activated carbon. See U.S. Pat. No. 4,072,479 and U.S. Pat. No. 4,072,480. U.S. Pat. No. 4,072,479 suggests that hydrogen sulfide is oxidized to elemental sulfur in the presence of activated carbon, and that the presence of moisture on the activated carbon is significant. We cannot confirm the accuracy of these observations. Another method for removing sulfur and other compounds from gas streams utilizes a product known as Purakol K, which is carbon impregnated with NaOH and KI.

Other uses of impregnated carbon include removing water from air (dessication), see, for example, Soviet Union Patent No. 1,219,122 (activated carbon combined with aluminum oxide; a binder, calcium hydroxide; and lithium bromide); and the removal of acidic contaminants from gas streams, see, for example, U.S. Pat. No. 4,215,096 (activated carbon impregnated with sodium hydroxide and moisture, for the removal of chlorine from gas streams) and U.S. Pat. No. 4,273,751 (activated carbon impregnated with sodium hydroxide and moisture, for the removal of sulfur oxide gases and vapors from gas streams).

Japanese Patent No. 61-178809 teaches water purification by treatment with activated carbon loaded with metallic copper or copper salts. Several patents teach alumina and carbon adsorbents, including U.S. Pat. No. 3,360,134 (alumina hydrate contacted with a carbonaceous solution; used as a decolorizing agent, a reviving agent for precious metal electroplating bath for the removal of constituents from cigarette smoke, and as an adsorbent in pressure or gravity flow percolation beds); U.S. Pat. No. 4,449,208 (powdered carbon, dense alumina, and a binder, for increasing heat capacity of the adsorbent to enhance the operation of adiabatic pressure swing adsorption processes by decreasing the cyclic temperature change in the adsorbent bed during each cycle of the process); U.S. Pat. No. 3,819,532 (ground graphite and finely divided alumina adsorbent, for removing aromatics, heterocyclics, sulfur compounds, and colored materials from lubricating oils); and U.S. Pat. No. 3,842,014 (ground graphite and alumina binder, for adsorbing parafins). Such art generally teaches a substrate consisting primarily of activated carbon with a relatively small amount of alumina.

None of the prior art compositions have effectively solved the problem of the combustibility of activated carbon. This problem can be critical in installations such as nuclear power plants.

With respect to the use of alumina substrates as compositions for deodorizing air, the prior art teaches that alumina is one substrate which is suitable for chemical treatment with potassium permanganate. It appears that the permanganate destroys odors by oxidation:

$$MnO_4^- + 8H^+ + 5e^- \rightarrow Mn^{+2} + 4H_2O \text{ (acid)}$$

$$3MnO_4 + 2H_2O \rightarrow MnO_2 + 2MnO_4 + 4OH \text{ (alkaline)}$$

$$MnO_4^- + 2H_2O + 3e^- \rightarrow MnO_2 + 2H_2O \text{ (neutral)}$$

Because the permanganate will not ionize to release the active permanganate ion unless water is present, the substrate must be hydrophilic and the reaction must take place in normal ambient humidity. See U.S. Pat. No. 3,049,399. Other art teaches a method of producing granular activated alumina uniformly impregnated with a solid oxidizing agent for use in treating fluid streams. See U.S. Pat. No. 3,226,332, the contents of which are incorporated herein by reference.

SUMMARY OF THE INVENTION

The prior art does not teach or suggest, however, the discovery of the present invention, namely, a solid filtration medium combining powdered activated carbon with activated alumina, and preferably with the addition of moisture, sodium bicarbonate, and, optionally, other impregnates. Such a filtration medium has a higher capacity to adsorb certain undesired compounds at high efficiency from gaseous streams than do the media in the prior art. In addition, some embodiments of the adsorbent medium of the present invention enjoy increased physical strength due to use of a carbonate such as alumina and sodium bicarbonate. Further, the capability of using inexpensive powdered activated carbon reduces production costs. Similarly, the use of sodium bicarbonate appears to facilitate effective curing at relatively low curing temperatures, resulting in additional savings. The granular carbon used in the prior art generally is significantly more expensive than powdered carbon, the by-product of producing granular carbon. Further, powdered carbon if substituted in the compounds of the prior art would be too fine and dusty for use in solid filter beds. The adsorbent filtration medium of the present invention also requires a higher ignition temperature than the carbon compounds of the prior art, which are classified as combustible solids. Finally, the prior art has for years generally pursued carbon and alumina adsorbent media as alternative media. No comparably effective combination of these materials is taught or suggested in the prior art. We have discovered that only a relatively small amount of carbon need be added to activated alumina to greatly increase the effectiveness of the adsorbent.

Generally described, the present invention provides an adsorbent composition, comprising from about 35% to about 90% of activated alumina, from about 5% to about 47% of high surface area carbon, and from about 5% to about 30% of water, all by weight of the composition. It is believed that the high proportion of alumina in the composition according to the invention results in a more open pore structure containing "macropores." Such a structure is less likely to be clogged by the adsorbed compounds than activated carbon (alone or impregnated with small amounts of alumina). This may explain why the composition according to the invention has a greater adsorption capacity and efficiency than unimpregnated as well as impregnated activated carbons. Furthermore, the alumina supports the carbon, provides hardness even at very high surface areas, and increases the ignition temperature of the composition.

The present invention also provides an adsorbent composition generally described as comprising water, high surface area carbon, activated alumina and sodium bicarbonate. In this embodiment, the invention particularly lowers material and fuel costs. The sodium bicarbonate is a low cost material that imparts strength to pellets of the composition cured at lower temperatures, thus saving fuel. It is believed that the sodium bicarbonate also reduces the flammability of the filter bed and may synergistically assist the chemical reactions involving compounds adsorbed by the composition.

The composition may preferably include an impregnate operative to cause inactivation of an undesirable substance in a gas stream passing over the composition. The impregnate preferably is a hydroxide of a Group 1A metal, which may optionally be combined with a Group 7A salt of a Group 1A metal. For example, the alumina, carbon and sodium bicarbonate mixture may be impregnated with potassium hydroxide and potassium iodide. This latter composition has a higher adsorption capacity and efficiency for removal of $H_2S$ than activated carbon impregnated with either NaOH or a mixture of NaOH and KI. It is believed that the KI enhances the action of the KOH catalytically or synergistically. The presence of alumina may also have an enhancing effect on these impregnates.

Generally described, the present invention also provides a process for making an adsorbent composition, comprising the steps of forming a mixture of activated alumina and high surface area carbon and water into at least one cohesive unit, and curing said cohesive unit at an elevated temperature, preferably 100–225 degrees F. for at least one hour. Preferably, a dry feed mix is made of the carbon, alumina, and sodium bicarbonate, and the dry feed mix is tumbled or rolled while being sprayed with liquid.

The present invention also provides a method of removing impurities from a gas or liquid stream, generally described as contacting the gas stream with a composition of the type described above.

In accordance with a preferred embodiment of the present invention, activated carbon, activated alumina, moisture, sodium bicarbonate, and optionally one or more impregnates selected from the group consisting of NaOH, KOH, LiOH, NaCl, KCl, NaBr, KBr, NaI, KI, LiCl, LiBr, LiI, $Na_2S_2O_3$ and $KMnO_4$ are combined and then employed for enhanced removal of undesirable compositions from gas streams.

The new filtration media embodying the present invention provide improved efficiency in removing $H_2S$ from gas streams. At some levels of removal efficiency ("breakthrough efficiency"), pellets embodying the invention will last over 90% longer than activated carbon impregnated with sodium hydroxide, and will provide better removal efficiency. Filtration media embodying the invention are also capable of removing chlorine gas and hydrocarbons from gas streams.

Thus, it is an object of the present invention to provide an improved adsorbent incorporating alumina and carbon.

It is a further object of the present invention to provide methods for producing and using a solid filtration medium incorporating alumina and carbon.

It is a further object of the present invention to provide an adsorbent composition that combines and catalyzes or exceeds the individual adsorptive and deodorizing or filtering properties of powdered activated carbon, activated alumina, moisture, sodium bicarbonate and, optionally, other impregnates.

It is a further object of the present invention to provide an adsorbent composition which maintains its integrity in high velocity air streams.

The activated alumina preferably employed in the present invention is a composite of 85% - 325 mesh alumina, such as CP-5 and CP-7, manufactured by the Aluminum Company of America, Pittsburg, PA; or DD290 and DD7, manufactured by Discovery Chemical, Baton Rouge, LA; or Versal 250, manufactured by Kaiser Aluminum. Other acceptable activated aluminas may be characterized as workable, or dehydrated with a loss on ignition (LOI) characteristic of preferably less than or equal to 20, and most preferably, an LOI of 6.

The activated carbon preferably employed in the present invention is nuclear grade carbon. It has been found that the rate of adsorption depends upon the surface area of the carbon used. Accordingly, it is important to employ activated carbons having high surface areas, preferably between 500 and 1200 $m^2/g$ surface area, and most preferably between 1050–1150 $m^2/g$. Thus it is preferred to use ground activated carbon, such as 207C or 208C, manufactured by Sutcliff and Speakman, Inc., Lutherville, MD.

Powdered activated carbon may be used instead of granular activated carbon, and indeed is preferred thereto. Carbon black also may be used. Activated carbon, powdered carbon and carbon black are collectively referred to herein as "high surface area carbon." The size range of the power is largely a matter of choice, although some parameters are necessary for insuring that uniform pellets are achieved during rolling. The preferred carbon is sized for passing 85% -325 mesh screen.

It is preferred that the proportion of high surface area carbon in a composition embodying the invention be 50% or less.

The sodium bicarbonate preferably employed in the present invention is food grade, for consistency in size of the particulates thereof. This factor affects the ability to roll the initial mixture and the size of the resultant pellet. The mesh screen size should be -60 mesh and preferably is 85% weight on a 325 mesh.

The impregnates used may be selected from the group consisting of hydroxides of Group 1A metals, and Group 7A salts of Group 1A metals. In particular, the impregnates may be one or more of the following: NaOH, KOH, LiOH, NaCl, KCl, NaBr, KBr, NaI, KI, LiCl, LiBr, LiI, $Na_2S_2O_3$, or $KMnO_4$. It is not known how the impregnates function in the filtration medium, but it is believed that they react with the adsorbed undesired compounds. U.S. Pat. No. 3,049,399, previously mentioned and incorporated herein by reference, discloses the presumed oxidation by permanganate.

The halide salts used as impregnates, particularly the potassium iodide, appear to have a binding affect on the pelletized filtration medium. Whereas pellets prepared only with water tend to be softer and more dusty, a general improvement is obtained when the pellet is impregnated with sodium chloride, further improvement with potassium chloride, and still further improvement with potassium iodide. Heating the impregnating solution prior to rolling the pellets in a tumble mill appears to allow the pellets to begin curing immediately, yielding better physical characteristics than an impregnating solution applied at room temperature. This can be achieved using a solution temperature between about room temperature and the boiling point of the solution. The preferred solution temperature is about 200° F.

The combination of activated carbon powder, activated alumina, and water may be carried out in any manner which effectively produces an adsorbent formed of a dry mix containing about 50% to about 95% by weight of activated alumina, and about 5% to about 50% by weight of activated carbon powder. About 5% to about 30% by weight of water should be contained by weight of the cured adsorbent product. The preferred amount of alumina in the dry mix is from about 50% to about 75% by weight, while the most preferred amount is about 50% by weight. The preferred amount of activated carbon is from about 25% to about 50% by weight, while the most preferred amount isabout 50% by weight. The final product should contain from about 5% to about 20% by weight of water.

The amount of moisture present in the composition in accordance with the present invention will depend on several factors, related primarily to the characteristics of the activated carbon and alumina being treated. The desired moisture content of the composition is readily obtained by spraying the dry mix ingredients while they roll on the mixer, in accordance with the method of U.S. Pat. No. 3,226,332.

The combination of sodium bicarbonate with activated carbon powder, activated alumina, and water similarly may be carried out in any manner which effectively combines a dry mix containing about 5% to about 80% by weight of sodium bicarbonate; about 5% to about 90% by weight of activated carbon powder; and about 5% to about 90% by weight of activated alumina with water. The final product should contain about 5% to about 30% by weight of water preferably from about 5% to about 20%. The preferred amount of sodium bicarbonate is from about 30% to about 50% by weight of the dry mix.

Impregnation of either of the above combinations may be carried out in any manner which effectively produces an adsorbent of about 0.1% to about 15% by weight of impregnate formed by using a solution of about 0.5% to about 50% impregnate. Impregnation may be carried out simply by soaking said combinations in one bed volume of impregnate solution. The time required to produce the desired impregnation level is dependent upon the impregnate employed, and will only be as much time as is needee for the impregnate to penetrate said combinations.

For example, impregnation with a combination of KOH and KI may be carried out by using a solution of about 3.0% to about 20.0% KOH and a solution of about 3.0% to about 20.0% KI. The resulting pellet should contain from about 1.0% to about 10.0% each of KOH and KI. Impregnation with NaOH, KCl, NaCl or other suitable impregnates also may be carried out in any manner which effectively produces an adsorbent of about 1.0% to about 10.0% by weight of impregnate, formed by using a solution of up to about 20.0% impregnate.

Other methods of impregnating the combinations would suggest themselves as equally appropriate and these are included within the scope of the present invention. For example, the impregnate solution may be passed through the combinations rather than being used in a static immersion treatment. However, it has been found that a preferred method of impregnation is sprayaddition in which an impregnate solution is sprayed onto the dry combination being tumbled in a mixer. This method of impregnation has been described in U.S. Pat. No. 3,226,332.

The adsorbent of the present invention is employed to remove undesired compositions by adsorption from ambient gas streams. The concentration of these undesirable compounds in the gas streams is not considered critical to the process of the present invention, and concentrations resulting in levels as low as less than one PPB of the compounds passing through the activated carbon per minute can be removed by adsorption.

The physical and chemical makeup of the gas stream from which it is desired to remove undesirable compositions is not critical. It may be important that oxidizing conditions prevail but it is not known to what extent oxidation may affect the purification achieved by the present invention. Typically, the undesired compositions will be removed from air, especially from air admixed with effluent gas streams resulting from municipal waste treatment facilities, petrochemical refining plants, hospital and hotel facilities, and so forth. The oxidizing conditions which may be important are generally that oxygen be present in the gas stream being treated, at least in small amounts. This oxygen content is readily found in the gas stream, if air comprises a sufficient portion of the gas stream being treated. If oxygen is totally absent or present in insufficient amounts, oxygen may be independently introduced into the gas stream being treated. A number of factors affect the amount of oxygen which may be required for maximum adsorption in accordance with the present invention, including the concentration and absolute amount of compounds being adsorbed from the gas stream being treated.

With respect to the amount of compound adsorbed, it is recognized that the following factors affect the process: the basic degree of attraction of the activated carbon or alumina for the compound; the pore structure and size of the activated carbon and alumina; the specific surface area of the activated carbon and alumina; and the surface characteristics of the activated carbon and alumina.

The impregnation treatment of the activated starting material in accordance with the present invention has not been found to be critical with respect to the particular sequence in which the dry mix is impregnated with moisture and impregnates.

The adsorbent composition of the present invention is appropriately used alone in beds for the removal of undesirable compounds. It is also appropriate, however, to use the composition of the present invention in conjunction with beds containing other adsorbents. Such combination is especially appropriate when high levels of chlorine or hydrocarbons are present in the gas stream. Any such bed may be placed either upstream (before the adsorbent of the present invention with respect to the effluent gas being treated) or downstream.

It has also been found that flow rates of the gas stream being treated through the bed of adsorbent affect the breakthrough capacities of the adsorbent. The preferred flow rate is between 10 and 750 ft/min, and most preferably is between 60 and 100 ft/min perpendicular to the face of the bed.

The following examples will serve better to illustrate the composition and the treatment methods of the present invention and the adsorption capacity produced thereby. Reference is made to a tumble mill in the following examples. Such reference is to a small scale rolling disc used in a laboratory setting. The disc is 14" in diameter with a depth of 4". The disc is angled at 30° from the vertical, and operated at a speed of 20 rpm. By comparison, a full scale production disc is typically 48" in diameter with a depth of 4", and is operated at the same angle and the same speed. The laboratory conditions yield pellets that are approximately the same size as the full scale disc, but not as strong, because the periphery of the disc moves at a slower speed. Thus, the pellets do not experience the same amount of force during rolling. Therefore, it is expected that pellets formed on a full scale disc using the same starting materials as described in the following examples would be stronger, and would perform better than as indicated in the examples. It should be noted that the continuous flow systems described in several of the following examples all were operated in a relative humidity of 40–50%.

EXAMPLE 1

An adsorbent composition is prepared as follows:

A dry feed mix is prepared by combining, by weight, 33% activated alumina, 33% activated carbon powder, and 33% sodium bicarbonate, and spraying the mixture with a 15% KOH and 15% KI aqueous solution at 200° F. while the dry feed mix is being tumbled in a tumble mill. The resulting pellets are then dried at 135–140° F. in air, relative humidity at about 35%, until the pellets contain about 10% by weight of moisture, 5% by weight of KOH, 5% by weight of KI, 26.6% alumina, 26.6% carbon and 26.6% sodium bicarbonate.

EXAMPLE 2

A study is carried out to evaluate the removal efficiency of the adsorbent composition of the present invention for hydrogen sulfide ($H_2S$, molecular weight 34.08) in a gas stream. The adsorbent composition is composed of a dry feed mix as in Example 1 of 33% activated carbon powder 207C, having a surface area in excess of 1,000 square meters per gram, and passing through a 325 mesh screen; 33% activated alumina DD290, having a loss on ignition factor (LOI) of 6.0; and 33% by weight of sodium bicarbonate of food grade, sized leaving 28% on a 325 mesh screen; and impregnated with an aqueous solution of 15% potassium hydroxide (KOH) and 15% potassium iodide (KI) at 200° F. Curing is as in Example 1. The resulting pellet contains about 10% by weight of moisture, 5% of KOH, and 5% of KI. The pellets are screened to 3½×6 mesh for testing. The performance of this impregnated composition is also compared to that of an impregnated activated carbon (IVP), by evaluating the performance of the composition and of the impregnated activated carbon under the same conditions.

The impregnated activated carbon is IVP activated carbon, manufactured by Calgon Carbon Corporation, consisting of 73–78% activated carbon and 7–12% NaOH, screened to 4×6 mesh.

The testing is carried out in a continuous flow system in which the test columns consist of a 1.02 in. diameter glass tubes, charged to a bed height of 3 inches. The sample charge weights are 26.2 grams for the IVP, and 28.46 grams for the composition. Hydrogen sulfide gas of molecular weight 34.08 is passed through each sample bed at a bed velocity of 75 ft/min and an airflow volume rate of 12,100 milliliters per minute. The residence time of the gas is 0.2 seconds. The $H_2S$ content of the inlet and outlet gas streams is measured by a flame photometric sulfur analyzer. All samples are tested under ambient conditions. The results of these evaluations are summarized in Table 1 below.

TABLE 1

| Time Upstream (hours) | $H_2S$ IN (PPB) | Adsorbent Composition (15% KOH, 15% KI Impregnate Solutions) | | | IVP | | |
|---|---|---|---|---|---|---|---|
| | | $H_2S$ OUT (PPB) | % EFF. | Wgt. % (CUM) | $H_2S$ OUT (PPB) | % EFF. | Wgt. % (CUM) |
| 24 | 4900 | 30 | 99.4 | 0.4 | 30 | 99.4 | 0.5 |
| 48 | 4950 | 25 | 99.5 | 0.9 | 30 | 99.4 | 0.9 |
| 72 | 4950 | 40 | 99.2 | 1.3 | 60 | 98.8 | 1.4 |
| 96 | 4900 | 55 | 98.9 | 1.7 | 110 | 97.8 | 1.8 |
| 120 | 4900 | 100 | 98.0 | 2.1 | 130 | 97.3 | 2.3 |
| 144 | 4850 | 140 | 97.1 | 2.5 | 200 | 95.9 | 2.7 |
| 168 | 4800 | 225 | 95.3 | 2.9 | 200 | 95.8 | 3.2 |
| 192 | 4800 | 230 | 95.2 | 3.3 | 270 | 94.4 | 3.6 |
| 264 | 4850 | 330 | 93.2 | 4.5 | 350 | 92.8 | 4.9 |
| 288 | 5000 | 500 | 90.0 | 4.9 | 610 | 87.8 | 5.3 |
| 384 | 4700 | 600 | 87.2 | 6.3 | 690 | 85.3 | 6.8 |
| 456 | 4650 | 620 | 86.7 | 7.4 | 750 | 83.9 | 7.9 |
| 480 | 4650 | 680 | 85.4 | 7.7 | 800 | 82.8 | 8.2 |
| 504 | 4600 | 740 | 83.9 | 8.0 | 840 | 81.7 | 8.6 |
| 600 | 4950 | 900 | 81.8 | 9.4 | 1050 | 78.8 | 10.1 |
| 672 | 4950 | 1250 | 74.7 | 10.4 | 1400 | 71.7 | 11.1 |
| 768 | 5000 | 1200 | 76.0 | 11.7 | 1400 | 72.0 | 12.4 |
| 796 | 5000 | 1250 | 75.0 | 12.1 | 1400 | 72.0 | 12.8 |
| 816 | 4950 | 1300 | 73.7 | 12.4 | 1450 | 70.7 | 13.1 |

On a relative basis, the average efficiency of the adsorbent of the present invention over 816 hours is 86.3%, while the IVP efficiency is 84.2%. The data for Wgt. % (cum.) states the cumulative amount adsorbed as a percentage of the original weight of the adsorbent.

EXAMPLE 3

A study is carried out to evaluate the removal efficiency of the adsorbent composition of the present invention for $H_2S$. A dry feed mix is prepared as in Example 2, and is impregnated with a 30% aqueous solution of potassium hydroxide (KOH) at 200° F. Curing is as in Example 1. The resulting pellets (3½×6 mesh) contain about 10% by weight of moisture and 10% of KOH.

The testing is carried out in a continuous flow system as described in Example 2. The sample charge weight is 25.35 grams. Hydrogen sulfide gas of molecular weight 34.08 is passed through the sample bed at a bed velocity of 75 ft/min and an airflow volume rate of 12,100 milliliters per minute. The residence time of the gas is 0.2 seconds. The $H_2S$ content of the inlet and outlet gas streams is measured by a flame photometric sulfur analyzer. All samples are tested under ambient conditions. The results of these evaluations are summarized in Table 2 below.

TABLE 2

| Time Upstream (hours) | H2S IN (PPB) | Adsorbent Composition (30% KOH Impregnate Solution) | | |
|---|---|---|---|---|
| | | H$_2$S OUT (PPB) | % EFF. | Wgt. % (CUM) |
| 24 | 4900 | 95 | 98.1 | 0.5 |
| 48 | 4950 | 130 | 97.4 | 0.9 |
| 72 | 4950 | 200 | 96.0 | 1.4 |
| 96 | 4900 | 320 | 93.5 | 1.8 |
| 120 | 4900 | 440 | 91.0 | 2.3 |
| 144 | 4850 | 540 | 88.9 | 2.7 |
| 168 | 4800 | 625 | 87.0 | 3.1 |
| 192 | 4800 | 700 | 85.4 | 3.5 |
| 264 | 4850 | 875 | 82.0 | 4.7 |

EXAMPLE 4

A dry feed mix is prepared of 75% by weight activated alumina DD290, having a loss on ignition factor (LOI) of 6.0; and 25% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. Curing is as in Example 1. The cured pellets are a strong, non-dusting filter media suitable for placement in filter beds. They provide an efficient adsorbent for many undesirable compounds.

EXAMPLE 5

A dry feed mix is prepared of 90% by weight activated alumina DD290, having a loss on ignition factor (LOI) of 6.0; and 10% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 6

A dry feed mix is prepared of 50% by weight activated alumina DD290, having a loss on ignition factor (LOI) of 6.0; 25% sodium bicarbonate of food grade, sized leaving 28% on a 325 mesh screen; and 25% by weight of activated carbon powder 208C, having a surface area in excess of 1000 square meters per gram and passing through a 325 mesh screen. The dry feed mix is mixed in a tumbling mill will with 5% by weight (of the final composition) of water sprayed onto the dry feed mix while tumbling, in the manner described in U.S. Pat. No. 3,226,332. Curing is as in Example 1. The cured pellets are a strong, non-dusting filter media suitable for placement in filter beds. They provide an efficient adsorbent for many undesirable compounds.

EXAMPLE 7

A study is carried out to evaluate the removal efficiency of the adsorbent composition of the present invention for hydrogen sulfide (H$_2$S) in a gas stream. A dry feed mix is prepared composed of 50% activated carbon powder 207C, having a surface area in excess of 1,000 square meters per gram, and passing through a 325 mesh screen; 25% activated alumina DD290, having a loss on ignition (LOI) of 6.0; 25% by weight of sodium bicarbonate of food grade, sized leaving 28% on a 325 mesh screen; and is impregnated with a 30% aqueous solution of potassium hydroxide (KOH) at 200° F. Curing is as in Example 1. The resulting pellets (3½×6 mesh) contain about 10% by weight KOH and 10% by weight of water.

The testing is carried out in a continuous flow system as described in Example 2. The sample charge weight is 27.01 grams. Hydrogen sulfide gas of molecular weight 34.08 is passed through each sample bed at a bed velocity of 75 ft/min and an airflow volume rate of 12,100 milliliters per minute. The residence time of the gas is 0.2 seconds. The H$_2$S content of the inlet and outlet gas streams is measured by a flame photometric sulfur analyzer. All samples are tested under ambient conditions. The results of these evaluations are summarized in Table 3 below.

TABLE 3

| Time Upstream (hours) | H2S IN (PPB) | Adsorbent Composition (30% KOH Impregnate Solution | | |
|---|---|---|---|---|
| | | H$_2$S OUT (PPB) | % EFF. | Wgt. % (CUM) |
| 24 | 4900 | 50 | 99.0 | 0.4 |
| 48 | 4950 | 110 | 97.8 | 0.9 |
| 72 | 4950 | 210 | 95.8 | 1.3 |
| 96 | 4900 | 300 | 93.9 | 1.7 |
| 120 | 4900 | 400 | 91.8 | 2.2 |
| 144 | 4850 | 430 | 91.1 | 2.6 |
| 168 | 4800 | 500 | 89.6 | 2.9 |
| 192 | 4800 | 550 | 88.5 | 3.3 |
| 264 | 4850 | 780 | 83.9 | 4.5 |

EXAMPLE 8

A study is carried out to evaluate the removal efficiency of the adsorbent composition of the present invention for hydrogen sulfide (H$_2$S) in a gas stream. A dry feed mix is prepared composed of 50% activated carbon powder 207C, having a surface area in excess of 1,000 square meters per gram, and passing through a 325 mesh screen; 25% activated alumina DD290, having a loss on ignition (LOI) of 6.0; 25% by weight of sodium bicarbonate of food grade, sized leaving 28% on a 325 mesh screen; and is impregnated with an aqueous solution of 15% potassium hydroxide (KOH) and 15% potassium iodide (KI) at 200° F. Curing is as in Example 1. The resulting pellets (3½×6 mesh) contain about 10% by weight of water, 5% of KOH and 5% of KI.

The testing is carried out in a continuous flow system as described in Example 2. The sample charge weight is 28.66 grams. Hydrogen sulfide gas of molecular weight 34.08 is passed through each sample bed at a bed velocity of 75 ft/min and an airflow volume rate of 12,100 milliliters per minute. The residence time of the gas is 0.2 seconds. The H$_2$S content of the inlet and outlet gas streams is measured by a flame photometric sulfur analyzer. All samples are tested under ambient conditions. The results of these evaluations are summarized in Table 4 below.

TABLE 4

| Time Upstream (hours) | H2S IN (PPB) | Adsorbent Composition (15% KOH, 15% KI Impregnate Solution) | | |
|---|---|---|---|---|
| | | H$_2$S OUT (PPB) | % EFF. | Wgt. % (CUM) |
| 24 | 4900 | 30 | 99.4 | 0.4 |
| 48 | 4950 | 50 | 99.0 | 0.8 |
| 72 | 4950 | 90 | 98.2 | 1.3 |
| 96 | 4900 | 140 | 97.1 | 1.7 |
| 120 | 4900 | 250 | 94.9 | 2.1 |
| 144 | 4850 | 260 | 94.6 | 2.5 |
| 168 | 4800 | 310 | 93.5 | 2.9 |
| 192 | 4800 | 370 | 92.3 | 3.2 |
| 264 | 4850 | 490 | 89.9 | 4.4 |

EXAMPLE 9

A dry feed mix is prepared of 50% by weight activated alumina DD290, having a loss on ignition factor (LOI) of 6.0; and 50% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours at 35% relative humidity. The cured pellets are a strong, non-dusting filter media suitable for placement in filter beds. They provide an efficient adsorbent for many undesirable compounds, particularly sulfur compounds.

EXAMPLE 10

A dry feed mix is prepared of 33% by weight activated alumina DD290, having a loss on ignition factor (LOI) of 6.0; 33% sodium bicarbonate of food grade, sized leaving 28% on a 325 mesh screen, and 33% by weight of activated carbon powder 208C, having a surface area in excess of 1000 square meters per gram and passing through a 325 mesh screen. The dry feed mix is mixed in a tumbling mill with 5% by weight (of the final composition) of water at 200° F. sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds, particularly sulfur compounds. The above process is repeated with the sprayed water at room temperature while tumbling. The result is a somewhat weaker, more dusty pellet.

EXAMPLE 11

A dry feed mix is prepared of 33% by weight activated alumina DD290, having a loss on ignition factor (LOI) of 6.0; 33% sodium bicarbonate of food grade, sized leaving 28% on a 325 mesh screen, and 33% by weight of activated carbon powder 208C, having a surface area in excess of 1000 square meters per gram and passing through a 325 mesh screen. The dry feed mix is mixed in a tumbling mill with 10% by weight (of the final composition) an aqueous KMnO$_4$ solution at 200° F. sprayed onto the dry feed mix while tumbling, in the manner described in U.S. Pat. No. 3,226,332. The resulting pellets contain 10% by weight of water after being cured in air at 140 degrees F. for 24 hours. The cured pellets are a strong, non-dusting filter media suitable for placement in filter beds. They provide an efficient adsorbent for many undesirable compounds, particularly ethylene and sulfur compounds.

EXAMPLE 12

A dry feed mix is prepared of 50% by weight activated alumina DD290, having a loss on ignition factor (LOI) of 6.0; 25% by weight activated alumina DD7, having a loss on ignition factor (LOI) of 12; and 25% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds, particularly sulfur compounds.

EXAMPLE 13

A dry feed mix is prepared of 25% by weight activated alumina DD290, having a loss on ignition factor (LOI) of 6.0; 45% by weight activated alumina DD7, having a loss on ignition factor (LOI) of 12; and 30% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds, particularly sulfur compounds.

EXAMPLE 14

A dry feed mix is prepared of 25% by weight activated alumina DD290, having a loss on ignition factor (LOI) of 6.0; 25% by weight activated alumina DD7, having a loss on ignition factor (LOI) of 12; and 50% by weight of activated carbon powder 280C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 15

A dry feed mix is prepared of 50% by weight activated alumina DD290, having a loss on ignition factor (LOI) of 6.0; 20% by weight activated alumina DD7, having an LOI factor of 12; 15% by weight of activated carbon power 208C, having a surface area in excess of 1000 square meters per gram and passing through a 325 mesh screen; and 15% by weight sodium bicarbonate.

The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds, particularly sulfur compounds.

EXAMPLE 16

A dry feed mix is prepared of 80% by weight activated alumina DD290, having a loss on ignition factor (LOI) of 6.0; 5% by weight activated alumina DD7 having an LOI of 12; 10% by weight of activated carbon powder 208C, having a surface area in excess of 1000 square meters per gram and passing through a 325 mesh screen; and 5% by weight sodium bicarbonate. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 17

A dry feed mix is prepared of 50% by weight activated alumina DD7, having a loss on ignition factor (LOI) of 12; 25% sodium bicarbonate of food grade, sized leaving 28% on a 325 mesh screen, and 25% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 18

A dry feed mix is prepared of 45% by weight activated alumina DD7, having a loss on ignition factor (LOI) of 12; 25% sodium bicarbonate of food grade, sized leaving 28% on a 325 mesh screen, and 30% by weight of activated carbon powder 280C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an afficient adsorbent for many undesirable compounds.

EXAMPLE 19

A dry feed mix is prepared of 25% by weight activated alumina DD7, having a loss on ignition factor (LOI) of 12; 25% sodium bicarbonate of food grade, sized leaving 28% on a 325 mesh screen, and 50% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner decribed in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 20

A dry feed mix is prepared of 25% by weight activated alumina DD290, having a loss on ignition factor (LOI) of 6.0; 25% by weight activated alumina Versal-250, having a loss on ignition factor (LOI) of 27; and 50% by weight of activated carbon powder 208C, having a surface area in excess of 1000 square meters per gram and passing through a 325 mesh screen. They dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 21

A dry feed mix is prepared of 25% by weight activated alumina Versal-250, having a loss on ignition factor (LOI) of 27; 25% sodium bicarbonate of food grade, sized leaving 28% on a 325 mesh screen, and 50% by weight of activated carbon powder 208C, having a surface area in excess of 1000 square meters per gram and passing through a 325 mesh screen. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds.

EXAMPLE 22

A dry feed mix is prepared of 95% by weight activated alumina DD290, having a loss on ignition factor (LOI) of 6.0; and 5% by weight of activated carbon powder 208C, having a surface area in excess of 1000 square meters per gram and passing through a 325 mesh screen. The dry feed mix is mixed in a tumbling mill with 10% by weight (of the final composition) of water sprayed onto the dry feed mix while tumbling, in the manner described in U.S. Pat. No. 3,226,332. The resulting pellets are cured in air at 140degrees F. for 24 hours. The cured pellets are a strong, non-dusting filter media suitable for placement in filter beds. They provide an efficient adsorbent for many undesirable compounds.

EXAMPLE 23

A dry feed mix is prepared of 70% by weight activated alumina DD290, having a loss on ignition factor (LOI) of 6.0; and 30% by weight of activated carbon powder 208C, having a surface area in excess of 1000 square meters per gram and passing through a 325 mesh screen. The dry feed mix is mixed in a tumbling mill with a 15% aqueous solution of NaOH, sprayed at 200° F. onto the dry feed mix while tumbling, in the manner described in U.S. Pat. No. 3,226,332. The resulting pellets are cured in air at 140° F. for 24 hours, and contain by weight 10% NaOH and 10% water. The cured pellets are a strong, non-dusting filter media suitable for placement in filter beds. They provide an efficient adsorbent for many undesirable compounds.

EXAMPLE 24

A dry feed mix is prepared of 70% by weight activated alumina DD290, having a loss on ignition factor (LOI) of 6.0; and 30% by weight of activated carbon powder 208C, having a surface area in excess of 1000 square meters per gram and passing through a 325 mesh screen. The dry feed mix is mixed in a tumbling mill with a 15% aqueous solution of NaCl, sprayed at 200° F. onto the dry feed mix while tumbling, in the manner described in U.S. Pat. No. 3,226,332. The resulting pellets are cured in air at 140° F. for 24 hours, and contain by weight 10% NaCl and 10% water. The cured pellets are a strong, non-dusting filter media suitable for placement in filter beds. They provide an efficient adsorbent for many undesirable compounds.

EXAMPLE 25

A dry feed mix is prepared of 70% by weight activated alumina DD290, having a loss on ignition factor (LOI) of 6.0; and 30% by weight of activated carbon powder 208C, having a surface area in excess of 1000 square meters per gram and passing through a 325 mesh screen. The dry feed mix is mixed in a tumbling mill with a 15% aqueous solution of NaOH and a 15% aqueous solution of NaCl, sprayed at 200° F. onto the dry feed mix while tumbling, in the manner described in U.S. Pat. No. 3,226,332. The resulting pellets are cured in air at 140° F. for 24 hours, and contain by weight 5% NaOH, 5% NaCl, and 10% water. The cured pellets are a strong, non-dusting filter media suitable for placement in filter beds. They provide an efficient adsorbent for many undesirable compounds.

EXAMPLE 26

A dry feed mix is prepared of 70% by weight activated alumina DD290, having a loss on ignition factor (LOI) of 6.0; and 30% by weight of activated carbon powder 280C, having a surface area in excess of 1000 square meters per gram and passing through a 325 mesh screen. The dry feed mix is mixed in a tumbling mill with a 15% aqueous solution of KOH and a 15% aqueous solution of KCl, sprayed at 200° F. onto the dry feed mix while tumbling, in the manner described in U.S. Pat. No. 3,226,332. The resulting pellets are cured in air at 140° F. for hours, and contain by weight 5% KOH, 5% KCl, and 10% water. The cured pellets are a strong, non-dusting filter media suitable for placement in filter beds. They provide an efficient adsorbent for many undesirable compounds.

EXAMPLE 27

A dry feed mix is prepared of 70% by weight activated alumina DD290, having a loss on ignition factor (LOI) of 6.0; and 30% by weight of activated carbon powder 208C, having a surface area in excess of 1000 square meters per gram and passing through a 325 mesh screen. The dry feed mix is mixed in a tumbling mill with a 15% aqueous solution of KOH and a 15% aqueous solution of NaCl, sprayed at 200° F. onto the dry feed mix while tumbling, in the manner described in U.S. Pat. No. 3,226,332. The resulting pellets are cured in air at 140° F. for 24 hours, and contain by weight 5% KOH, 5% NaCl, and 10% water. The cured pellets are a strong, non-dusting filter media suitable for placement in filter beds. They provide an efficient adsorbent for many undesirable compounds.

EXAMPLE 28

A dry feed mix is prepared of 33% by weight activated alumina DD290, having a loss on ignition factor (LOI) of 6.0; 33% by weight of activated carbon powder 280C, having a surface area in excess of 1000 square meters per gram and passing through a 325 mesh screen; and 33% sodium bicarbonate. The dry feed mix is mixed in a tumbling mill with a 20% aqueous solution of sodium thiosulfate ($Na_2S_2O_3$) sprayed at room temperature onto the dry feed mix while tumbling, in the manner described in U.S. Pat. No. 3,226,332. The resulting pellets are cured in air at 140 ° F. for 24 hours, and contain by weight 10% $Na_2S_2O_3$ and 10% water. The cured pellets are suitable for placement in filter beds for the adsorption of undesirable compounds, particularly chlorine.

EXAMPLE 29

An adsorbent composition is prepared as follows:

A dry feed mix is prepared by combining, by weight, 33% activated alumina, 33% activated carbon powder and 33% sodium bicarbonate, and spraying the mixture with a 15% KOH aqueous solution at 200° F. while the dry feed mix is being tumbled in a tumble mill. The resulting pellets are then dried at 135°–140° F. in air, relative humidity at about 35%, until the pellets contain about 15% by weight of moisture, and 5% by weight of KOH.

EXAMPLE 30

An adsorbent composition is prepared as follows:

A dry feed mix is prepared by combining, by weight, 25% activated alumina, 50% activated carbon powder and 25% sodium bicarbonate, and spraying the mixture with 30% NaOH aqueous solution at 200° F. while the dry feed mix is being tumbled in a tumble mill. The resulting pellets are then dried at 135°–140° F. in air, relative humidity at about 35%, until the pellets contain about 10% by weight of moisture, and 10% by weight of NaOH.

EXAMPLE 31

The preparation and testing of example 2 are repeated for a composition prepared with the impregnate spray being at room temperature. The same testing of such composition with a sample charge weight of 26.39 grams, 4×6 mesh, gave the following results presented in Table 5:

TABLE 5

| Time Upstream (hours) | $H_2S$ IN (PPB) | Adsorbent Composition (15% KOH, 15% KI Impregnate Solution) | | |
|---|---|---|---|---|
| | | $H_2S$ OUT (PPB) | % EFF. | Wgt. % (CUM) |
| 24 | 4900 | 10 | 99.8 | 0.5 |
| 48 | 4950 | 11 | 99.8 | 0.9 |
| 72 | 4950 | 34 | 99.3 | 1.4 |
| 96 | 4900 | 50 | 99.0 | 1.8 |
| 144 | 4950 | 130 | 97.4 | 2.7 |
| 168 | 4950 | 150 | 97.0 | 3.2 |
| 240 | 5000 | 220 | 95.6 | 4.5 |

TABLE 5-continued

| Time Upstream (hours) | H2S IN (PPB) | Adsorbent Composition (15% KOH, 15% KI Impregnate Solution) | | |
|---|---|---|---|---|
| | | H2S OUT (PPB) | % EFF. | Wgt. % (CUM) |
| 264 | 5000 | 240 | 95.2 | 5.0 |
| 288 | 4950 | 285 | 94.2 | 5.4 |
| 312 | 4950 | 300 | 93.9 | 5.8 |

EXAMPLE 32

A study is carried out to evaluate the removal efficiency of the absorbent composition of the present invention for $H_2S$. A dry feed mix is prepared as in Example 2; and is impregnated with an aqueous solution of 15% potassium hydroxide (KOH) and 15% potassium chloride (KCl), at room temperature. Curing is as in Example 1. The resulting pellets (4×6 mesh) contain about 10% by weight of moisture, 5% of KOH, and 5% of KCl.

The testing is carried out in a continuous flow system as described in Example 2. The sample charge weight is 26.1 grams. Hydrogen sulfide gas of molecular weight 34.08 is passed through each sample bed at a bed velocity of 75 ft/min and an airflow volume rate of 12,100 milliliters per minute. The residence time of the gas is 0.2 seconds. The $H_2S$ content of the inlet and outlet gas streams is measure by a flame photometric sulfur analyzer. All samples are tested under ambient conditions. The results of these evaluations are summarized in Table 6 below.

TABLE 6

| Time Upstream (hours) | H2S IN (PPB) | Adsorbent Composition (15% KOH, 15% KCl Impregnate Solution) | | |
|---|---|---|---|---|
| | | H2S OUT (PPB) | % EFF. | Wgt. % (CUM) |
| 24 | 4900 | 10 | 99.8 | 0.5 |
| 48 | 4950 | 22 | 99.6 | 0.9 |
| 72 | 4950 | 88 | 98.2 | 1.4 |
| 96 | 4900 | 140 | 97.1 | 1.8 |
| 144 | 4950 | 260 | 94.7 | 2.7 |
| 168 | 4950 | 330 | 93.3 | 3.2 |
| 240 | 5000 | 450 | 91.0 | 4.5 |
| 264 | 5000 | 520 | 89.6 | 4.9 |
| 288 | 4950 | 610 | 87.7 | 5.3 |
| 312 | 4950 | 650 | 86.9 | 5.7 |

EXAMPLE 33

A study is carried out to evaluate the removal efficiency of the adsorbent composition of the present invention for $H_2S$. A dry feed mix is prepared as in Example 2; and is impregnated with an aqueous solution of 15% potassium hydroxide (KOH) and 15% sodium chloride (NaCl), at room temperature. Curing is as in Example 1. The resulting pellets (4×6 mesh) contain about 10% by weight of moisture, 5% of KOH, and 5% of NaCl.

The testing is carried out in a continuous flow system as described in Example 2. The sample charge weight is 23.83 grams. Hydrogen sulfide gas of molecular weight 34.08 is passed through each sample bed at a bed velocity of 75 ft/min and an airflow volume rate of 12,100 milliliters per minute. The residence time of the gas is 0.2 seconds. The $H_2S$ content of the inlet and outlet gas streams is measured by a flame photometric sulfur analyzer. All samples are tested under ambient conditions. The results of these evaluations are summarized in Table 7 below.

TABLE 7

| Time Upstream (hours) | H2S IN (PPB) | Adsorbent Composition (15% KOH, 15% NaCl Impregnate Solution) | | |
|---|---|---|---|---|
| | | H2S OUT (PPB) | % EFF. | Wgt. % (CUM) |
| 24 | 4900 | 25 | 99.5 | 0.5 |
| 48 | 4950 | 78 | 98.4 | 1.0 |
| 72 | 4950 | 190 | 96.2 | 1.5 |
| 96 | 4900 | 280 | 94.3 | 2.0 |
| 114 | 4950 | 405 | 91.8 | 2.9 |
| 168 | 4950 | 500 | 89.9 | 3.4 |
| 240 | 5000 | 620 | 87.6 | 4.7 |
| 264 | 5000 | 680 | 86.4 | 5.2 |
| 288 | 4950 | 770 | 84.4 | 5.6 |
| 312 | 4950 | 840 | 83.0 | 6.1 |

EXAMPLE 34

A study is carried out to evaluate the removal efficiency of the adsorbent composition of the present invention for chlorine gas($Cl_2$). A dry feed mix is prepared and impregnated as in Example 2. Curing is as in Example 1. The resulting pellets are screened to 4×6 mesh and contain about 10% by weight of moisture, 5% of KOH, and 5% of KI.

The testing is carried out in a continuous flow system as described in Example 2. The sample charge weight is 27.5 grams. A test column containing IVP (charge weight 26.61) is simultaneously tested under the same conditions. Chlorine gas of molecular weight 70.91 is passed through each sample bed at a bed velocity of 75 ft/min and an airflow volume rate of 12,100 milliliters per minute. The residence time of the gas is 0.2 seconds. The $Cl_2$ content of the inlet and outlet gas streams is measured using p colorimetric analyzer. All samples are tested under ambient conditions. The results of these evaluations are summarized in Table 8 below.

TABLE 8

| Time Upstream (hours) | Cl2 IN (PPB) | Adsorbent Composition (15% KOH, 15% KI Impregnate Solutions) | | | IVP | | |
|---|---|---|---|---|---|---|---|
| | | Cl2 OUT (PPB) | % EFF. | Wgt. % (CUM) | Cl2 OUT (PPB) | % EFF. | Wgt. % (CUM) |
| 24 | 1620 | 0 | 100.0 | 0.3 | 0 | 100.0 | 0.3 |
| 48 | 1450 | 0 | 100.0 | 0.6 | 0 | 100.0 | 0.6 |
| 72 | 1400 | 0 | 100.0 | 0.8 | 0 | 100.0 | 0.9 |
| 96 | 1375 | 0 | 100.0 | 1.1 | 0 | 100.0 | 1.1 |
| 144 | 1430 | 10 | 99.3 | 1.6 | 0 | 100.0 | 1.7 |

TABLE 8-continued

| | | Adsorbent Composition (15% KOH, 15% KI Impregnate Solutions) | | | IVP | | |
|---|---|---|---|---|---|---|---|
| Time Upstream (hours) | $Cl_2$ IN (PPB) | $Cl_2$ OUT (PPB) | % EFF. | Wgt. % (CUM) | $Cl_2$ OUT (PPB) | % EFF. | Wgt. % (CUM) |
| 168 | 1400 | 15 | 98.9 | 1.9 | 0 | 100.0 | 2.0 |
| 192 | 1430 | 20 | 98.6 | 2.1 | 0 | 100.0 | 2.2 |
| 216 | 1370 | 25 | 98.2 | 2.4 | 0 | 100.0 | 2.5 |
| 240 | 1400 | 28 | 98.0 | 2.7 | 0 | 100.0 | 2.8 |
| 312 | 1300 | 58 | 95.5 | 3.3 | 0 | 100.0 | 3.5 |
| 336 | 1300 | 76 | 94.2 | 3.6 | 0 | 100.0 | 3.8 |
| 384 | 1350 | 103 | 92.4 | 4.0 | 5 | 99.6 | 4.3 |
| 408 | 1300 | 117 | 91.0 | 4.3 | 10 | 99.2 | 4.5 |
| 480 | 1350 | 125 | 90.7 | 5.0 | 15 | 98.9 | 5.3 |
| 504 | 1350 | 140 | 89.6 | 5.2 | 15 | 98.9 | 5.6 |
| 528 | 1450 | 145 | 90.0 | 5.4 | 20 | 98.6 | 5.8 |
| 552 | 1400 | 145 | 89.6 | 5.7 | 25 | 98.2 | 6.1 |

EXAMPLE 35

A study is carried out to evaluate the removal efficiency of the adsorbent composition of the present invention for $H_2S$. A dry feed mix is prepared and impregnated as in Example 2, with curing as in Example 1. The resulting pellets are screened to 4×6 mesh, and contain about 10% by weight of moisture, 5% of KOH, and 5% of KI.

The testing is carried out in a continuous flow system as described in Example 2. The sample charge weight of the composition is 28.03 grams. A test column containing IVP (charge weight 26.31 grams) is simultaneously tested under the same conditions. Another test column containing Purakol K (charge weight 25.39 grams) also is simultaneously tested under the same conditions. Purakol K is an activated carbon impregnated with NaOH and KI. Hydrogen sulfide gas of a molecular weight 34.08 is passed through each sample bed at a velocity of 75 ft/min and an air flow volume rate 12,100 milliliters per minute. The residence time of the gas is 0.2 seconds. The $H_2S$ content of the inlet and outlet gas streams is measured by a flame photometric sulfur analyzer. All samples are tested under ambient conditions. The results of these evaluations are summarized in Table 9 below.

TABLE 9

| | | Adsorbent Composition (15% KOH, 15% KI Impregnates Solution) | | | IVP | | | Purakol K | | |
|---|---|---|---|---|---|---|---|---|---|---|
| Time Upstream (hours) | $H_2S$ IN (PPB) | $H_2S$ OUT (PPB) | % EFF. | Wgt. % (CUM) | $H_2S$ OUT (PPB) | % EFF. | Wgt. % (CUM) | PPB OUT | % EFF. | Wgt. % (CUM) |
| 24 | 4800 | 25 | 99.5 | 0.4 | 140 | 97.1 | 0.4 | 10 | 99.8 | 0.5 |
| 48 | 4750 | 45 | 99.1 | 0.8 | 210 | 95.6 | 0.9 | 25 | 99.5 | 0.9 |
| 72 | 4700 | 58 | 98.8 | 1.2 | 290 | 93.8 | 1.3 | 35 | 99.3 | 1.4 |
| 96 | 4700 | 50 | 98.9 | 1.7 | 200 | 95.7 | 1.7 | 45 | 99.0 | 1.8 |
| 144 | 4650 | 100 | 97.8 | 2.5 | 200 | 95.7 | 2.5 | 80 | 98.3 | 2.7 |
| 168 | 4650 | 110 | 97.6 | 2.9 | 230 | 95.1 | 3.0 | 115 | 97.5 | 3.2 |
| 192 | 4650 | 190 | 95.9 | 3.2 | 320 | 93.1 | 3.4 | 160 | 96.6 | 3.6 |
| 216 | 4900 | 270 | 94.5 | 3.7 | 500 | 89.8 | 3.8 | 260 | 94.7 | 4.1 |
| 240 | 4900 | 295 | 94.0 | 4.1 | 680 | 86.1 | 4.2 | 330 | 93.3 | 4.5 |
| 312 | 4950 | 340 | 93.1 | 5.3 | 840 | 83.0 | 5.3 | 570 | 88.5 | 5.8 |
| 336 | 4900 | 405 | 91.7 | 5.7 | 900 | 81.6 | 5.7 | 680 | 86.1 | 6.2 |
| 384 | 4950 | 600 | 87.9 | 6.4 | 1000 | 79.8 | 6.4 | 830 | 83.2 | 7.0 |
| 408 | 4950 | 630 | 87.3 | 6.8 | 1050 | 78.8 | 6.8 | 850 | 82.8 | 7.4 |
| 480 | 5000 | 650 | 87.0 | 8.0 | 1200 | 76.0 | 7.9 | 950 | 81.0 | 8.6 |
| 504 | 5000 | 710 | 85.8 | 8.4 | 1300 | 74.0 | 8.2 | 1000 | 80.0 | 9.0 |
| 528 | 4950 | 750 | 84.8 | 8.7 | 1250 | 74.7 | 8.6 | 1050 | 78.8 | 9.3 |
| 552 | 4950 | 830 | 83.2 | 9.1 | 1300 | 73.7 | 8.9 | 1100 | 77.8 | 9.7 |

EXAMPLE 36

Adsorbent compositions embodying the invention and described in foregoing examples are subjected to a bulk crush test and an abrasion test. The bulk crush test measures strength by determining the porcentage of a sample remaining uncrushed after subjecting the sample to a pressure of 200 pounds for one minute. The optimum rating is 35–45%. The abrasion test measures the degrees to which the pellets release dust. The optimum rating is under 6%. The test results are shown in Table 10.

TABLE 10

| | Dry Feed Mix | | | Impregnate | | Test Results | |
|---|---|---|---|---|---|---|---|
| Example No. | Alumina DD290 | Carbon 207C | Sodium Bicarbonate | Impreg. Solution | Soln. Temp. | Bulk Crush | Abrasion |
| 3 | 33% | 33% | 33% | 30% KOH | 200 F. | 54.9% | 2.0% |
| 2 | 33% | 33% | 33% | 15% KOH + | | | |

TABLE 10-continued

| Example No. | Dry Feed Mix | | | Impregnate | | Test Results | |
|---|---|---|---|---|---|---|---|
| | Alumina DD290 | Carbon 207C | Sodium Bicarbonate | Impreg. Solution | Soln. Temp. | Bulk Crush | Abrasion |
| | | | | 15% KI | 200 F. | 47.7% | 4.1% |
| 7 | 25% | 50% | 25% | 30% KOH | 200 F. | 37.3% | 0.6% |
| 8 | 25% | 50% | 25% | 15% KOH + 15% KI | 200 F. | 45.0% | 3.6% |
| 31 | 33% | 33% | 33% | 15% KOH + 15% KI | R.T. | 42.5% | 8.3% |
| 32 | 33% | 33% | 33% | 15% KOH + 15% KCl | R.T. | 39.8% | 5.9% |
| 33 | 33% | 33% | 33% | 15% KOH + 15% NaCl | R.T. | 33.0% | 13.3% |
| 28 | 33% | 33% | 33% | 20% Na2S2O3 | R.T. | 30.2% | 10.8% |
| 10 | 33% | 33% | 33% | H2O | R.T. | 34.2% | 16.1% |
| Calgon IVP | | | | | | 40.2% | 0.7% |

EXAMPLE 37

The adsorbent composition described in Example 2 is subjected to an autoignition test in which air at 700° C. is moved through the media. The media do not ignite. A similar test is conducted using IVP, as described in Example 2, and the IVP ignites when air moving through the IVP is raised to 450° C.

EXAMPLE 38

A study is carried out to evaluate the removal efficiency of the adsorbent composition of the present invention for chlorine in a liquid solution. A dry feed mix is prepared by combining, by weight, 5% activated alumina, 50% activated carbon powder, and 45% sodium bicarbonate. Water is added while the dry feed mix is being tumbled in a tumble mill. The activated alumina is known as DD290, having a loss on ignition factor (LOI) of 6.0. The activated carbon powder is known as 207C, having a surface area in excess of 1,000 square meters per gram, and passing through a 325 mesh screen. The sodium bicarbonate is of food grade, sized leaving 28% on a 325 mesh screen. Curing is as in Example 1. The resulting pellet contains about 10% by weight of moisture. The pellets are screened to 4×6 mesh for testing.

The testing is carried out in a continuous flow system in which the test columns consist of 1.02 inch diameter glass tubes, charged to a bed height of 3 inches. Water containing chlorine in solution is passed through each sample bed. Chlorine is removed from the solution.

EXAMPLE 39

The dry feed mix is prepared of 60% by weight activated alumina DD290, having a loss on ignition factor (LOI) of 6.0; 30% by weight activated carbon powder 280C, having a surface area in excess of 1,000 square meters per gram and passing through a 325 mesh screen; and 10% calcium carbonate. The dry feed mix is mixed in a tumbling mill with 5% by weight (of the final composition) of water sprayed onto the dry feed mix while tumbling, in the manner described in U.S. Pat. No. 3,226,332. Curing is as in Example 1. The cured pellets are strong, nondusting filter media suitable for placement in filter beds. They provide an efficient adsorbent for many undesirable compounds.

EXAMPLE 40

A dry feed mix is prepared of 33% by weight activated alumina DD290, having a loss on ignition factor (LOI) of 6.0; 33% by activated carbon black; and 33% by weight sodium bicarbonate of food grade, sized leaving 28% on a 325 mesh screen. The dry feed mix is mixed in a tumbling mill with 5% by weight (of the final composition) of water sprayed onto the dry feed mix while tumbling, in the manner described in U.S. Pat. No. 3,226,332. Curing is as in Example 1. The cured pellets are strong, nondusting filter media suitable for placement in filter beds. The provide an efficient adsorbent for many undesirable compounds.

EXAMPLE 41

A dry feed mix is prepared of 40% by weight activated alumina DD290, having a loss on ignition factor (LOI) of 6.0; 5% by weight activated alumina DD7 having an LOI of 12; 10% by weight of activated carbon powder 208C, having a surface area in excess of 1000 square meters per gram and passing through a 325 mesh screen; and 45% by weight sodium bicarbonate. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filer beds. They provide an efficient adsorbent for many undesirable compounds, particularly sulfur compounds.

EXAMPLE 42

A dry feed mix is prepared of 5% by weight activated alumina DD290, having a loss on ignition factor (LOI) of 6.0; 5% by weight activated alumina DD7 having an LOI of 12; 10% by weight of activated carbon powder 208C, having a surface area in excess of 1000 square meters per gram and passing through a 325 mesh screen; and 80% by weight sodium bicarbonate. The dry feed mix is mixed in a tumbling mill with 5% by weight (of the final composition) of water sprayed onto the dry feed mix while tumbling, in the manner described in U.S. Pat. No. 3,226,332. The resulting pellets are cured in air at 140 degrees F. for 24 hours. The cured pellets are a strong, non-dusting filter media suitable for placement in filter beds. They provide an efficient adsorbent for many undesirable compounds, particularly sulfur compounds.

While this invention has been described in detail with regard to preferred embodiments thereof, it should be understood that variations and modifications can be made without departing from the spirit and scope of the invention as defined in the following claims.

What is claimed is:

1. A process for making an adsorbent composition, consisting essentially of the steps of:
   (a) forming a mixture in water of the following components in the following proportions: from about 5% to about 90% finely divided carbon, from about 5% to about 90% alumina, and from about 5% to about 80% sodium bicarbonate;
   (b) forming said mixture into at least one cohesive unit; and
   (c) curing said unit at a temperature of from about 100 to about 225 degrees F. until said water is from about 5% to about 30% by weight of the composition.

2. The process of claim 1, wherein said step of forming said mixture into cohesive units comprises tumbling a preliminary mixture of said carbon, alumina and sodium bicarbonate while spraying water on said preliminary mixture so as to form nodules.

3. An adsorbent composition produced by the process of claim 1.

4. The composition of claim 3, wherein said activated alumina has an LOI less than 20; and wherein said activated carbon is powdered and has a surface area in excess of 1000 meters per gram.

5. The composition of claim 3, wherein said mixture in water further consists essentially of a hydroxide of a Group IA Group IIA metal; and wherein said curing step includes curing said unit until said hydroxide is from about 1% to about 15% by weight of the composition.

6. The composition of claim 5, wherein said mixture in water further consists essentially of a salt selected from the group consisting of calcium fluoride, calcium chloride, calcium iodide, magnesium fluoride, magnesium chloride, magnesium iodide, lithium iodide, sodium chloride, sodium fluoride, sodium iodide, potassium fluoride, potassium chloride, and potassium iodide; and wherein said curing step includes curing said until said hydroxide is from about 1% to about 10% by weight of the composition and said salt is from about 1% to about 10% by weight of the composition.

7. The composition of claim 5 wherein said hydroxide is potassium hydroxide.

8. The composition of claim 6 wherein said salt is potassium iodide.

9. A process for making an adsorbent composition, consisting essentially of the steps of:
   (a) forming a mixture of from about 5% to about 90% finely divided carbon, from about 5% to about 90% alumina, and from about 5% to about 80% sodium bicarbonate; and
   (b) combining said mixture with a mixture of from about 0.5% to 50% solutions in water of a hydroxide of a Group IA or Group IIA metal and a salt selected from the group consisting of calcium fluoride, calcium chloride, calcium iodide, calcium bromide, magnesium fluoride, magnesium chloride, magnesium iodide, magnesium bromide, sodium chloride, sodium fluoride, sodium iodide, potassium fluoride, sodium bromide, potassium chloride, potassium bromide and potassium iodide to form at least one cohesive unit; and
   (c) curing said unit at a temperature of from about 100 to about 225 degrees F. until said water is from about 5% to about 30% by weight of the composition, said hydroxide is from about 1% to about 10% by weight of the composition, and said salt is from about 1% to about 10% by weight of the composition.

10. An adsorbent composition produced by the process of claim 9.

11. A process for making an adsorbent composition, consisting essentially of the steps of:
   (a) forming a mixture of from about 5% to about 90% finely divided carbon, from about 5% to about 90% alumina, and
   (b) combining said mixture with a mixture of from about 0.5% to about 50% solutions in water of a hydroxide of a Group IA or Group IIA metal, and a salt selected from the group consisting of calcium fluoride, calcium chloride, calcium iodide, calcium bromide, magnesium fluoride, magnesium chloride, magnesium iodide, magnesium bromide, sodium chloride, sodium fluoride, sodium iodide, potassium fluoride, sodium bromide, potassium chloride, potassium bromide and potassium iodide to form at least one cohesive unit; and
   (c) curing said unit at a temperature of from about 100 to about 225 degrees F. until said water is from about 5% to about 30% by weight of the composition, said hydroxide is from about 1% to about 10% by weight of the composition, and said salt is from about 1% to about 10% by weight of the composition.

12. An adsorbent composition produced by the process of claim 11.

13. The adsorbent composition of claim 12, wherein said mixture of carbon and alumina is from about 25% to about 50% high surface area carbon and from 50% to about 75% activated alumina.

14. An adsorbent composition produced by a process consisting essentially of the steps of:
   (a) forming a mixture in water of the following components in the following proportions: from about 5% to about 90% finely divided carbon, from about 5% to about 90% alumina, and from about 5% to about 80% sodium bicarbonate;
   (b) forming said mixture into at least one cohesive unit; and
   (c) curing said unit said water is from about 5% to about 30% by weight of the composition.

15. An adsorbent composition, consisting essentially of:
   (a) about 27% by weight of activated alumina;
   (b) about 27% by weight high surface area carbon;
   (c) about 27% by weight sodium bicarbonate;
   (d) about 5% by weight potassium hydroxide;
   (e) about 5% by weight potassium iodide; and
   (f) about 10% by weight water.

* * * * *